(12) United States Patent
Jiang

(10) Patent No.: US 8,252,454 B2
(45) Date of Patent: Aug. 28, 2012

(54) BATTERY COVER LATCHING MECHANISM

(75) Inventor: Chu-Hua Jiang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 380 days.

(21) Appl. No.: 12/549,173

(22) Filed: Aug. 27, 2009

(65) Prior Publication Data

US 2010/0143779 A1 Jun. 10, 2010

(30) Foreign Application Priority Data

Dec. 10, 2008 (CN) .......................... 2008 1 0306084

(51) Int. Cl.
*H01M 2/00* (2006.01)
*H01M 2/02* (2006.01)
(52) U.S. Cl. ........................................ 429/163; 429/177
(58) Field of Classification Search ................ 429/97, 429/99–100, 122, 148, 151–154, 156, 159, 429/162–163, 175–177, 186; 29/623.1; 455/575.1, 455/575.4–575.5, 575.8, 90.1–90.3; 379/428.01, 379/428.04, 433.11–433.13; 292/102, 106–107, 292/128, 203, 228; 361/679.56–679.58, 361/814
See application file for complete search history.

(56) References Cited

U.S. PATENT DOCUMENTS

| | | | |
|---|---|---|---|
| 6,515,450 B1 * | 2/2003 | Kaiho et al. | 320/112 |
| 6,563,927 B2 * | 5/2003 | Mote et al. | 379/433.11 |
| 7,068,495 B2 * | 6/2006 | Luo et al. | 361/679.56 |
| 7,261,973 B2 * | 8/2007 | Tu et al. | 429/100 |
| 7,442,464 B2 * | 10/2008 | Li | 429/97 |
| 2007/0166608 A1 * | 7/2007 | Tu et al. | 429/97 |

FOREIGN PATENT DOCUMENTS

JP 2001-76694 A 3/2001
WO 2007/069552 A 6/2007

* cited by examiner

*Primary Examiner* — Raymond Alejandro
*Assistant Examiner* — Claire L Roe
(74) *Attorney, Agent, or Firm* — Altis Law Group, Inc.

(57) ABSTRACT

A battery cover latching mechanism is provided. The battery cover latching mechanism includes a body member, a battery cover, and an elastic member. One end of the elastic member resists the body member, the other end of the elastic member resists the battery cover. The battery cover is attached to the body member. The battery is attached to the battery cover. The elastic member provides an elastic force to open the battery cover allowing the battery to be removed from the body member.

6 Claims, 6 Drawing Sheets

200

BATTERY COVER LATCHING MECHANISM

BACKGROUND

1. Technical Field

The present disclosure relates to battery cover latching mechanisms and, particularly, to a battery cover latching mechanism used in a portable electronic device.

2. Description of Related Art

Batteries are used to provide power to portable electronic devices, e.g., mobile phones. Battery cover latching assemblies are usually provided to secure battery within portable electronic devices.

A typical battery cover latching assembly for an electronic device usually includes a body member, a battery cover, and latching means, e.g., a locking pin latching into a locking hole. The battery cover can be detachably mounted to a housing of portable electronic devices using the latching means. To replace the battery, the latching means is released, and then the battery cover is separated from the body member.

However, removal of the battery cover may require a strong force, which is inconvenient for a user to replace the battery. Furthermore, the battery cover may be lost or misplaced.

Therefore, there is room for improvement within the art.

BRIEF DESCRIPTION OF THE DRAWINGS

Many aspects of the battery cover latching mechanism can be better understood with reference to the following drawings. These drawings are not necessarily drawn to scale, the emphasis instead being placed upon clearly illustrating the principles of the present battery cover latching mechanism. Moreover, in the drawings like reference numerals designate corresponding sections throughout the several views.

DETAILED DESCRIPTION

The present battery cover latching mechanism is suitable for portable electronic devices, e.g., mobile phones.

Figure 1:
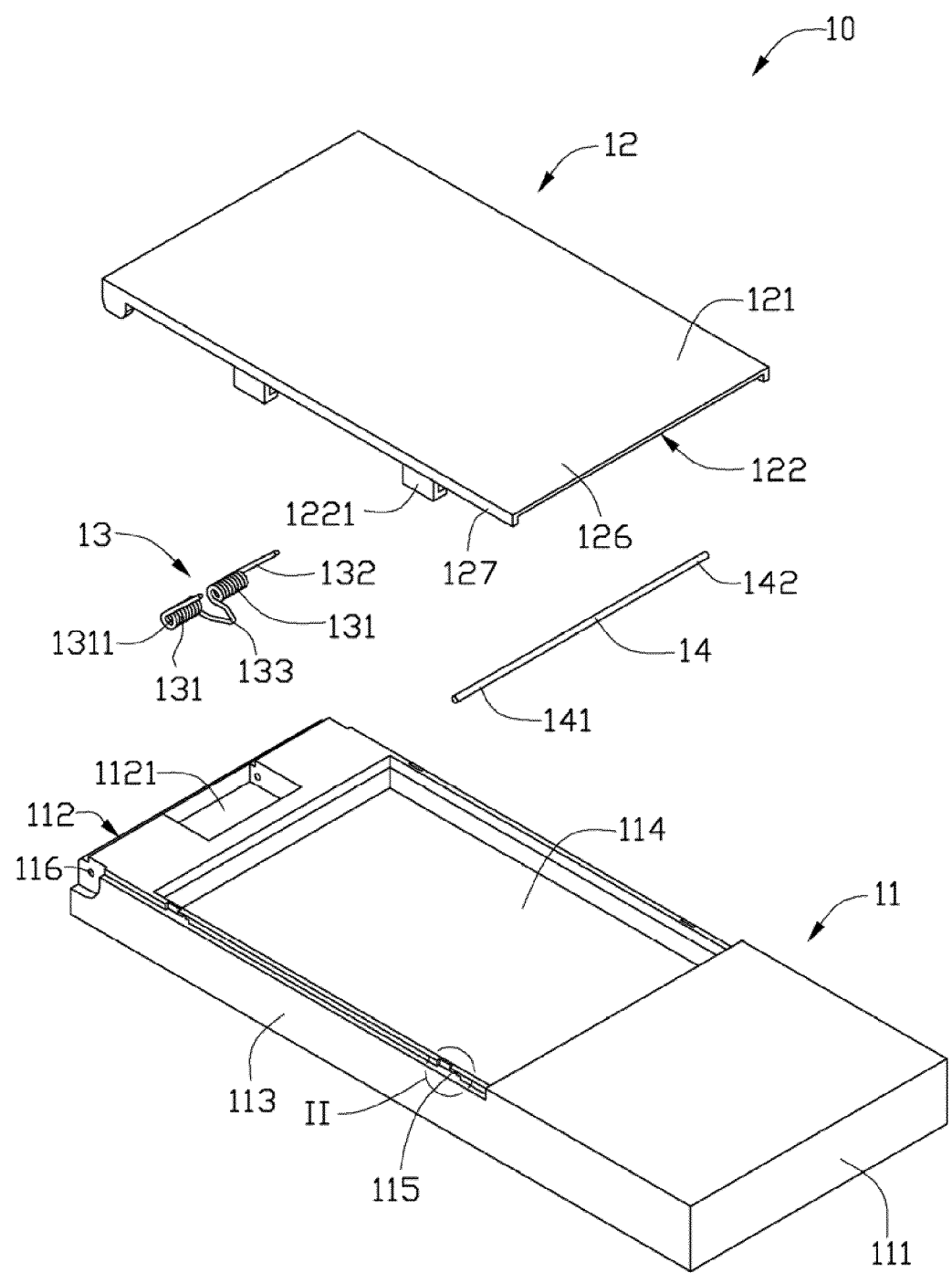
FIG. 1 is an exploded, isometric view of a battery cover latching mechanism, in accordance with an exemplary embodiment.
Figure 2:
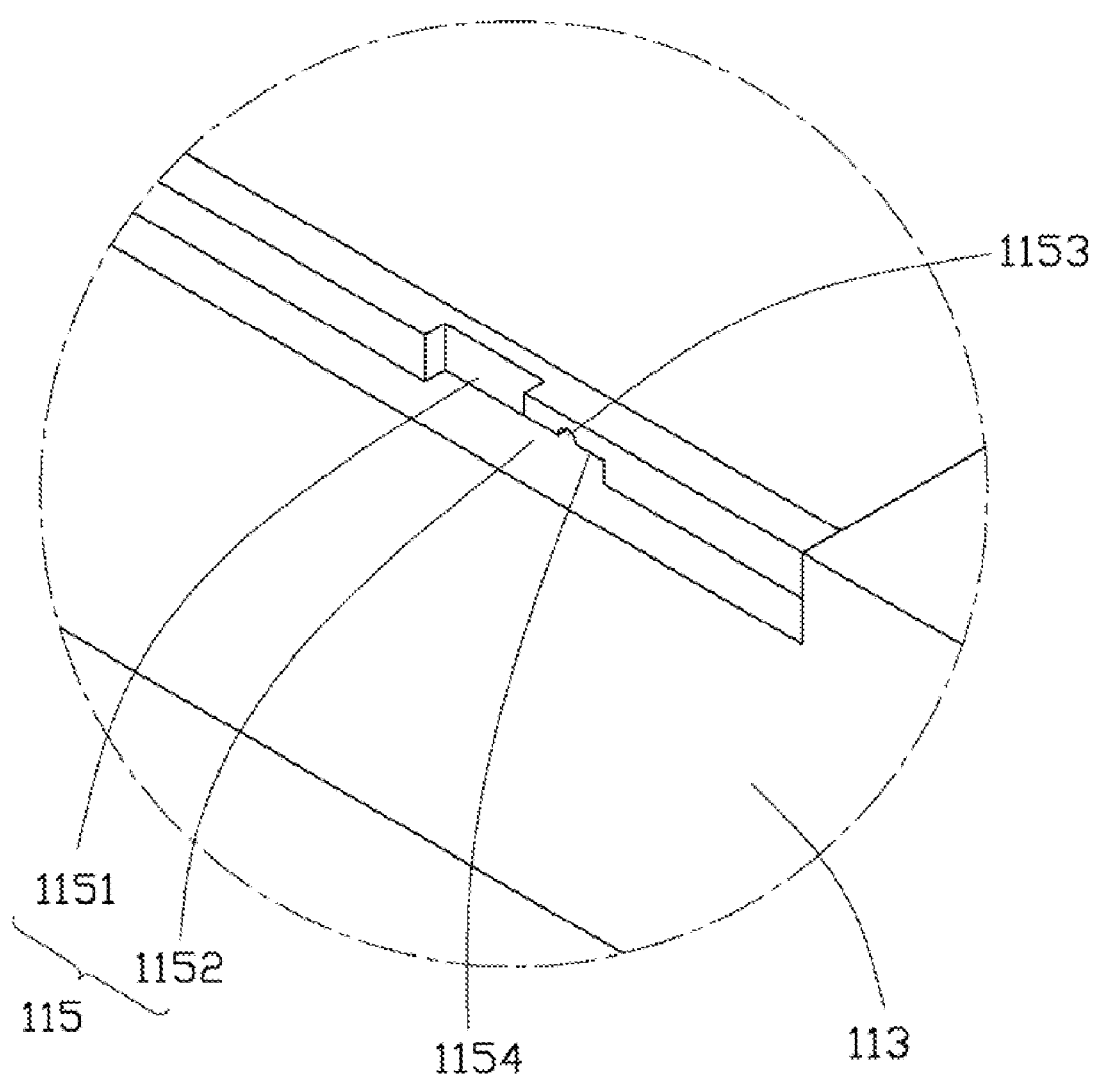
FIG. 2 is a partially, enlarged view of the area II shown in FIG. 1.
Figure 3:
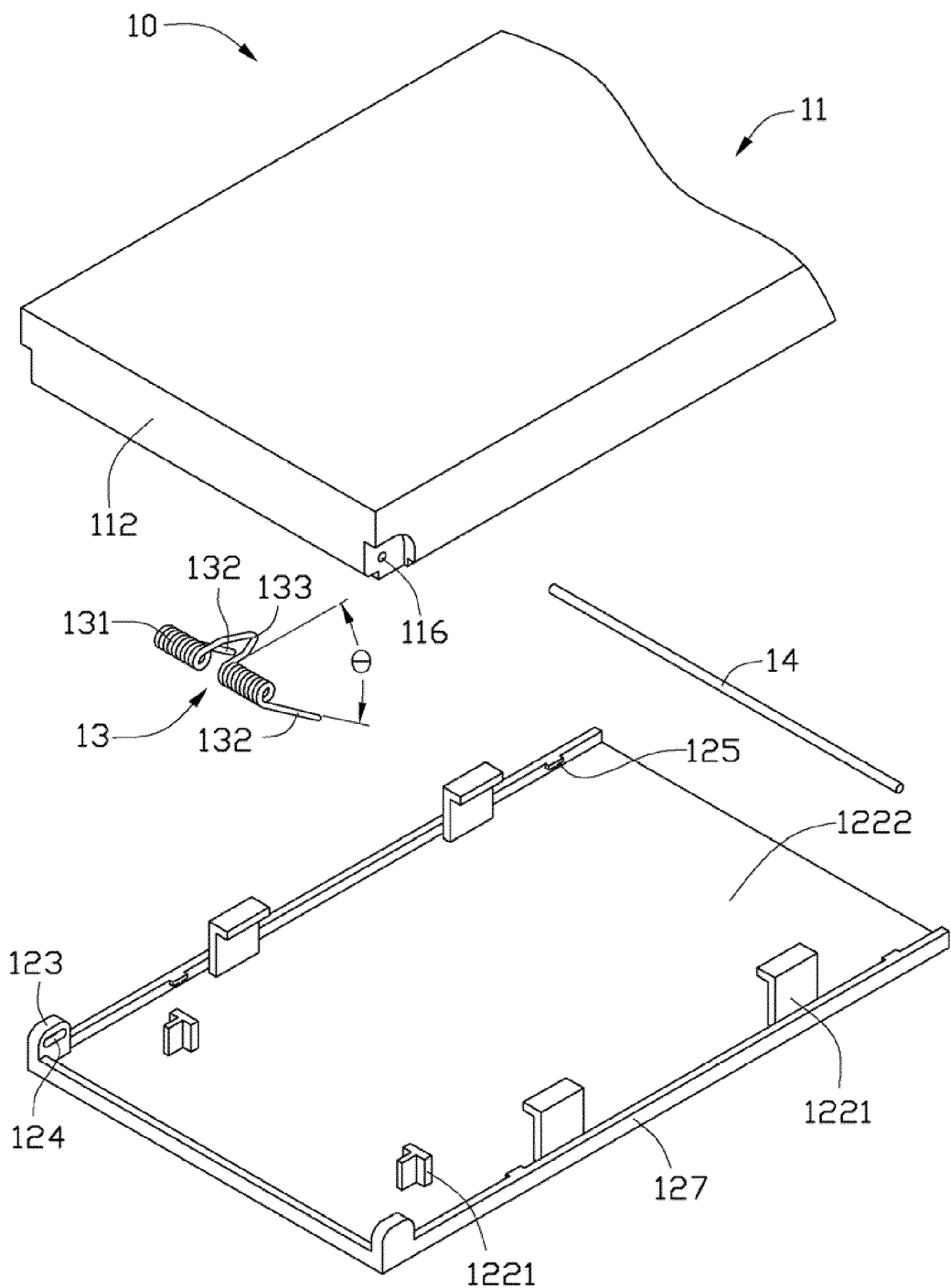
FIG. 3 is similar to FIG. 1, but viewed from another aspect.
Figure 6:
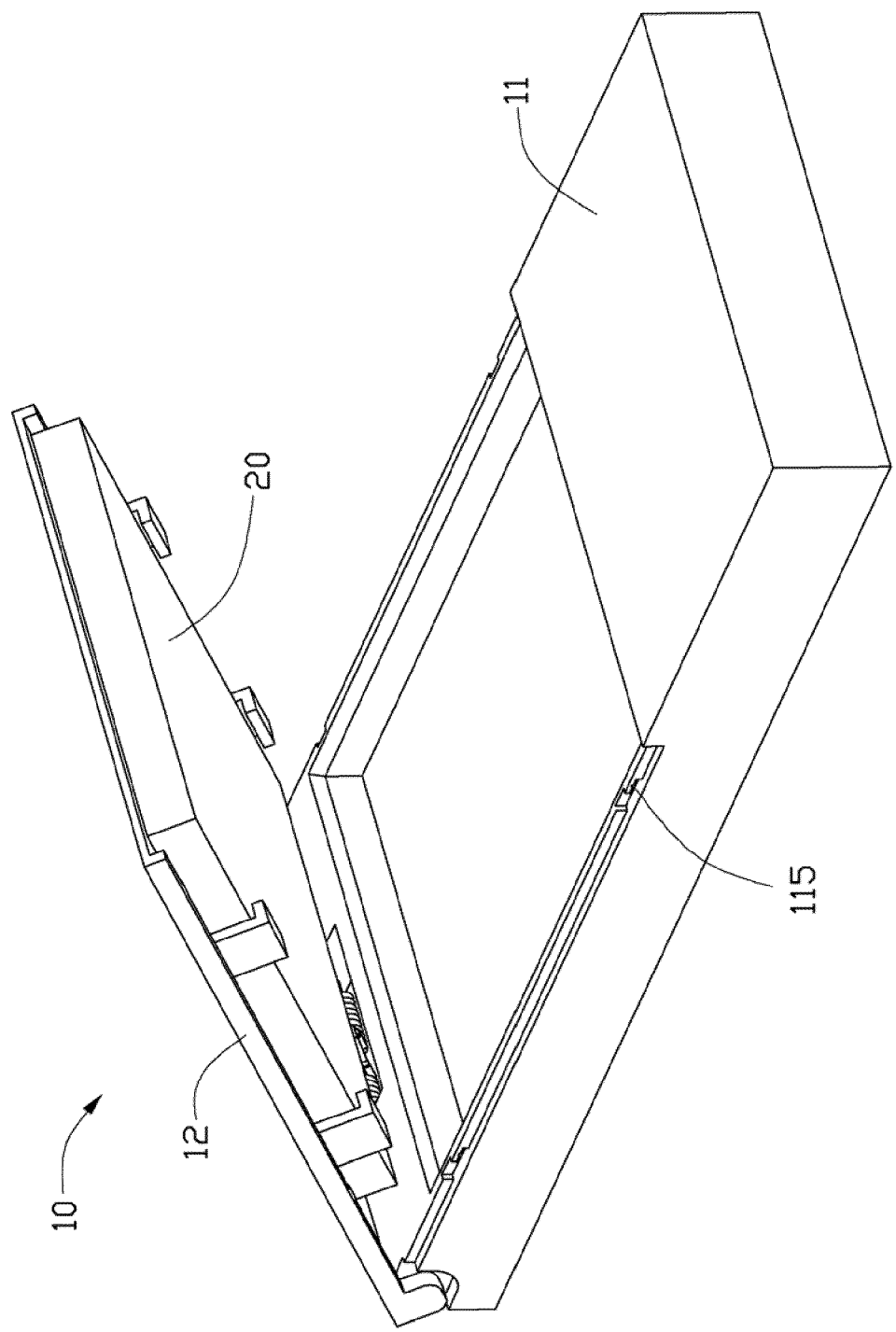
FIG. 6 is a schematic view, showing another working status of the battery cover latching mechanism shown in FIG. 4.

FIGS. 1 through 3 show an exemplary battery cover latching mechanism 10 used to latch a battery 20 therein (see FIG. 6). The battery cover latching mechanism 10 includes a body member 11, a battery cover 12, an elastic member 13, and a shaft 14. The battery cover 12 is rotatably attached to the body member 11 by the shaft 14. The elastic member 13, positioned between the body member 11 and the battery cover 12, resists the battery cover 12.

The body member 11 can be a housing of a portable electronic device. The body member 11 includes a top portion 111, a bottom portion 112 opposite to the top portion 111, and two sidewalls 113. The top portion 111, the bottom portion 112 and the sidewalls 113 surround a receiving space 114 for receiving the battery 20 therein. A receiving groove 1121 is defined in the bottom portion 112 of the body member 11. Two slots 115 are respectively defined in each sidewall 113.

In this embodiment, each slot 115 is "L"-shaped, and includes an inserting slot 1151 and a latching slot 1152 communicating with the inserting slot 1151 (see FIG. 2). Each sidewall 113 is recessed to define the inserting slot 1151 and the latching slot 1152. The latching slots 1152 are defined in a longitudinal direction. The sidewall 113 includes an interior wall 1154 adjacent to each latching slot 1152. Each interior wall 1154 defines a notch 1153. A pivoting hole 116 is defined in the bottom portion 112, used to rotatably receive the shaft 14. The pivoting hole 116 partially extends through the receiving groove 1121.

The battery cover 12 is mounted to the body member 11, and cover the receiving space 114. The battery cover 12 includes a main body 126 and two opposite sidewalls 127. The main body 126 includes an exterior surface 121 and an interior surface 122 opposite to the exterior surface 121. A plurality of limiting blocks 1221 protrude from the interior surface 122. The limiting blocks 1221 and the interior surface 122 cooperatively define a receiving cavity 1222, used to receive the battery 20 therein. When the battery cover 12 is mounted on the body member 11, the receiving cavity 1222 is superposed with the receiving space 114. Two mounting portions 123 are symmetrically formed on one end of the interior surface 122. Each mounting portion 123 defines a slit 124. Each slit 124 is a long, narrow cavity, extending longitudinally. A plurality of latching blocks 125 protrude from the two sidewalls 127, corresponding to the slots 115. A projection 1251 (see FIGS. 4 and 5) protrudes from each latching block 125, facing the interior surface 122 and used to latch with one corresponding notch 1153.

The elastic member 13 is a torsional spring, and includes two main portions 131, two fingers 132, and a connecting portion 133. Each of the main portions 131 is coil-shaped and defines a channel 1311 axially therein. Each finger 132 is formed at one end of one main portion 131. The two channels 1311 are co-axial. The connecting portion 133 is substantially V-shaped, and connects the other ends of the main portions 131 together. The fingers 132 and the connecting portion 133 together forms an angle designated by "θ". When the angle θ between the fingers 132 and the connecting portion 133 is decreased, a torsional force is generated against the deformation. The shaft 14 includes a first end 141 and a second end 142 opposite to the first end 141.

Figure 4:
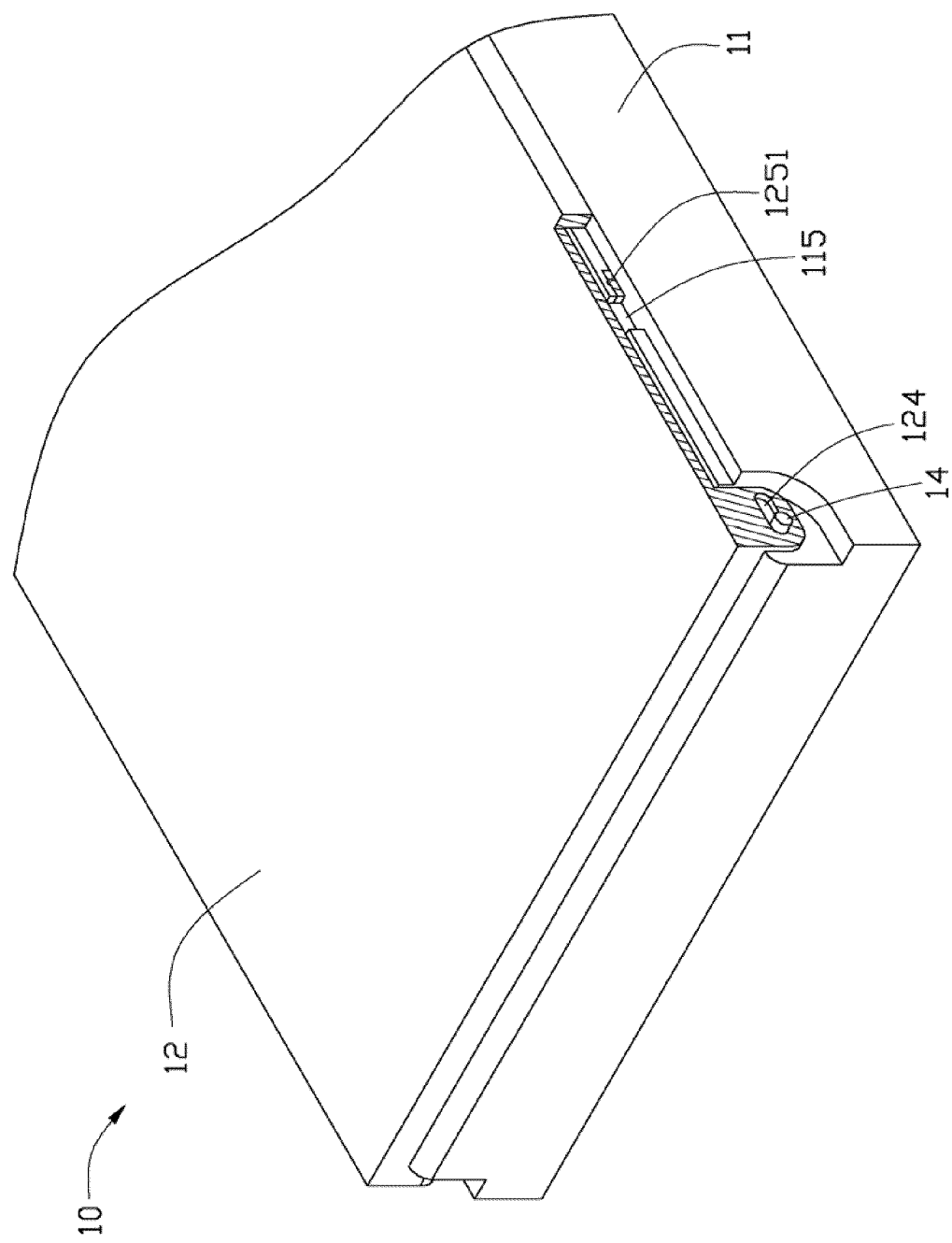
FIG. 4 is an assembled view of the battery cover latching mechanism shown in FIG. 1.
Figure 5:
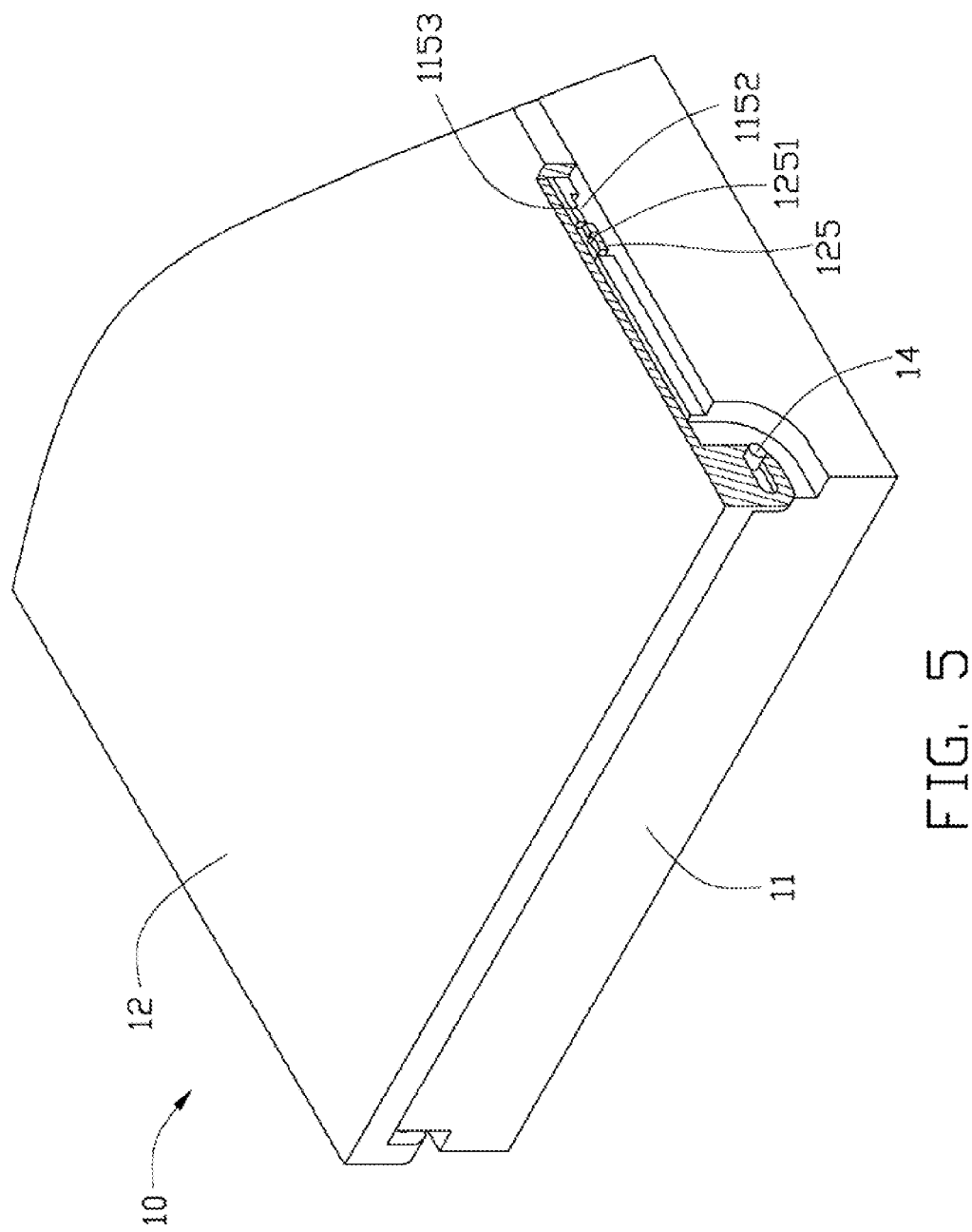
FIG. 5 is a schematic view, showing the working status of the battery cover latching mechanism shown in FIG. 4.

Referring to FIGS. 4 and 6 together, in assembly, the first end of the shaft 14 is inserted into the pivoting hole 116 from one side thereof until the first end 141 is received in the receiving groove 1121. The elastic member 13 is inserted into the receiving groove 1121, and the shaft 14 is received in the main portions 131. Then the shaft 14 is penetrated into the pivoting hole 116 again from the receiving groove 1121 and exposes out of the pivoting hole 116 from an opposite side thereof. Two opposite ends of the shaft 14 are respectively inserted into one slit 124. The battery cover 12 is rotated about the shaft 14 towards the body member 11 until the latching blocks 125 latch into the inserting slot 1151. At this time, the fingers 132 of the elastic member 13 resist the receiving groove 1121, and the two connecting portions 133 resist the interior surface 122 of the battery cover 12. The battery cover 12 is pushed to move towards the top end 11 of the body member 11 until the latching blocks 125 latch into the latching slot 1152. At this time, the projections 1251 respectively latch into one notch 1153, thus the battery cover latching mechanism 10 is assembled.

To replace the battery 20, the battery cover 12 is slid to move towards the bottom portion 112 of the body member 11 until the latching blocks 125 are released from the slots 115. At this time, the battery cover 12 can be carried up from the receiving space 114 by the elastic member 13. Thus, a user can easily remove the battery 20 out of the receiving cavity 1222. Furthermore, the battery cover 12 is rotatably linked to the body member 11, thus decreasing the chances of being lost or misplaced.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A battery cover latching mechanism used, comprising
   a body member defining a receiving space and a pivoting hole;
   a battery cover including an interior surface, a plurality of limiting blocks and two mounting portions, the inner surface and the limiting blocks cooperatively defining a receiving cavity receiving a battery, the mounting portions symmetrically formed on one end of the interior surface, each mounting portion defining a slit;
   an elastic member, one end of the elastic member resisting the body member, the other end of the elastic member resisting the battery cover; and
   a shaft extending through the slits of the mounting portions, the pivoting hole, and the elastic member to rotatably connect the battery cover to the body member;
   wherein when the battery cover is latched on the body member, the limiting blocks and the battery are received in the receiving space at a first state; when the battery cover is slid relative to the body member to allow the shaft to slide in the slit until the battery cover is unlocked from the body member, the battery cover with the battery together rotate to open relative to the body member; the elastic member provides an elastic force to automatically open the battery cover relative to the body member allowing the battery to be removed from the battery cover.

2. The battery cover latching mechanism as claimed in claim 1, wherein the elastic member is a torsional spring, and includes two main portions, two fingers, and a connecting portion, the two fingers are respectively formed at one end of one main portion, the connecting portion connects the other ends of the main portions together.

3. The battery cover latching mechanism as claimed in claim 2, wherein the body member defines a receiving groove, the elastic member is received in the receiving groove with the fingers resisting the body member, the connecting portion resisting the battery cover.

4. The battery cover latching mechanism as claimed in claim 1, wherein the battery cover includes a plurality of latching blocks, the body member defines a plurality of slots, each latching block latches into a corresponding slot.

5. The battery cover latching mechanism as claimed in claim 4, wherein each slot is "L"-shaped, and includes an inserting slot and a latching slot communicating with the inserting slot.

6. The battery cover latching mechanism as claimed in claim 5, wherein the body member defines a notch facing each latching slot, projections protrude from each latching block, corresponding to the notches, the projections latch into the notches.

* * * * *